United States Patent
Iwamura

(10) Patent No.: US 7,580,543 B2
(45) Date of Patent: Aug. 25, 2009

(54) INFORMATION PROCESSING APPARATUS, METHOD, PROGRAM AND STORAGE MEDIUM

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 11/244,257

(22) Filed: Oct. 4, 2005

(65) Prior Publication Data
US 2006/0072784 A1  Apr. 6, 2006

(30) Foreign Application Priority Data
Oct. 4, 2004  (JP) .............. 2004-291512

(51) Int. Cl.
G06K 9/00 (2006.01)
G06K 9/36 (2006.01)
(52) U.S. Cl. ...................... 382/100; 382/232
(58) Field of Classification Search .......... 382/100, 382/232, 240, 276; 713/176, 179; 380/51, 380/54, 210, 252, 287; 370/522–529; 283/72, 283/74–81, 85, 93, 113, 901, 902, 900; 348/461, 348/463, 384.1–440.01; 358/3.28, 426.01–426.16; 345/555; 708/203; 341/79; 705/75
See application file for complete search history.

(56) References Cited

U.S. PATENT DOCUMENTS 6,359,998 B1 * 3/2002 Cooklev ............. 382/100
6,553,129 B1 * 4/2003 Rhoads ............. 382/100
6,859,155 B2  2/2005 Kondo et al.

FOREIGN PATENT DOCUMENTS

| EP | 1 001 604 | 4/2004 |
|----|-----------|--------|
| JP | 2000-151411 | 5/2000 |
| JP | 2000-151973 | 5/2000 |
| JP | 2002-135555 A | 5/2002 |
| JP | 2002-335391 A | 11/2002 |

OTHER PUBLICATIONS

The above references were cited in a Apr. 10, 2009 Japanese Office Action that issued in Japanese Patent Application No. 2004-291512, a copy of which is enclosed without English Translation.

* cited by examiner

*Primary Examiner*—Samir A. Ahmed
*Assistant Examiner*—Mehdi Rashidian
(74) *Attorney, Agent, or Firm*—Cowan, Liebowitz & Latman, P.C.

(57) ABSTRACT

Provided are an information processing apparatus, method, program and storage medium whereby prescribed additional information such as a digital watermark can be embedded directly in encoded data, and later extracted, without decoding data that has been compressed and encoded by the JPEG scheme, etc. First, encoded data, which is information that has been encoded, is input from an encoded data input unit (101). An embed coefficient is selected in an embed coefficient selector (102) block by prescribed block, and a code transformation unit (103) replaces the encoded data by different encoded data, which corresponds to the input encoded data, input using a transformation table (104), whereby a digital watermark is embedded.

5 Claims, 15 Drawing Sheets

FIG. 2A

| CODE DATA | EMBED BIT | WATERMARK-CONTAINING CODE DATA |
|---|---|---|
| ⋮ | ⋮ | ⋮ |
| 0101 | 0 | 0101 |
| 0101 | 1 | 0100 |
| ⋮ | ⋮ | ⋮ |

FIG. 2B

| CODE DATA | EMBED BIT | WATERMARK-CONTAINING CODE DATA |
|---|---|---|
| ⋮ | ⋮ | ⋮ |
| 0101 | 0 | 0100 |
| 0101 | 1 | 0101 |
| ⋮ | ⋮ | ⋮ |

FIG. 4

| CODE DATA | KEY DATA | EMBED BIT | WATERMARK-CONTAINING ENCODED DATA |
|---|---|---|---|
| ...... | ...... | ...... | ...... |
| 0101 | k0 | 0 | 0101 |
| 0101 | k0 | 1 | 0100 |
| 0101 | k0 | 0 | 0101 |
| 0101 | k0 | 1 | 0100 |
| ...... | ...... | ...... | ...... |

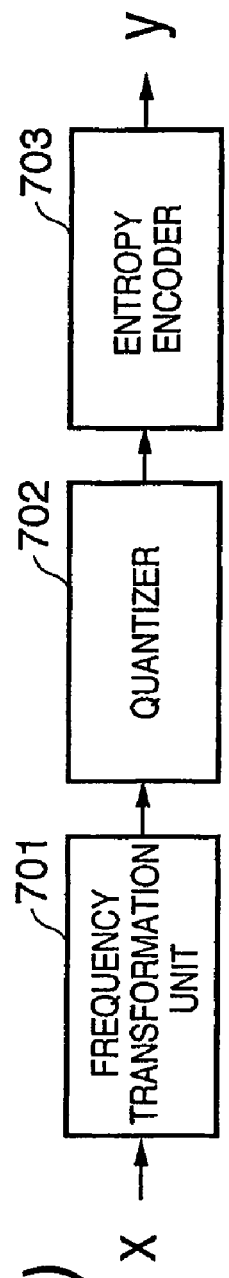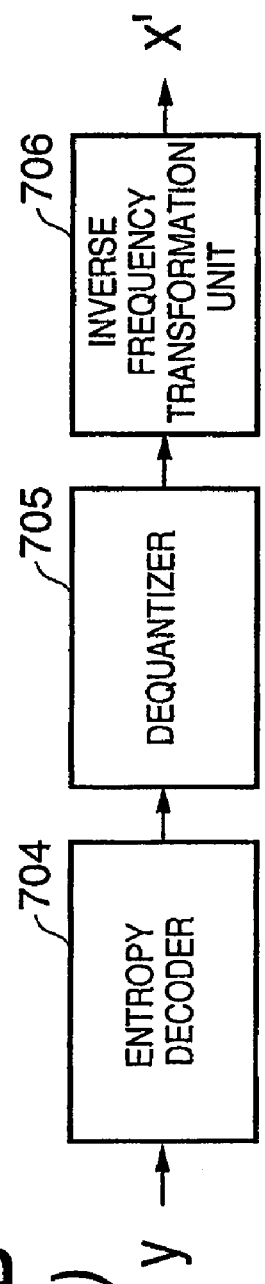
F I G. 7A (Prior Art)
F I G. 7B (Prior Art)

FIG. 10

| 17 | 18 | 24 | 47 | 66 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 66 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 11

| AC COEFFICIENTS | GROUP NO. | RUN LENGTH | | | | |
|---|---|---|---|---|---|---|
| | | 0 | 1 | 2 | ……… | 14 | 15 |
| 0 | 0 | EOB | | | | | |
| -1,1 | 1 | 00 | ⋮ | | | | |
| -3,-2,2,3 | 2 | 01 | ⋮ | | | | |
| -7..-4,4..7 | 3 | 100 | ⋮ | | | | |
| -15..-8,8..15 | 4 | 1011 | ⋮ | | | | |
| -31..-16,16..31 | 5 | 11010 | ⋮ | | | | |
| -63..-32,32..63 | 6 | …………………… | | | | | |
| -127..-64,64..127 | 7 | | | | | | |
| -255..-128,128..255 | 8 | | | | | | |
| OTHERS OMITTED | | | | | | | |

INFORMATION PROCESSING APPARATUS, METHOD, PROGRAM AND STORAGE MEDIUM

FIELD OF THE INVENTION

The present invention relates to an information processing apparatus, method, program and storage medium. More particularly, the invention relates to an information processing apparatus, method, program and storage medium for embedding specific information such as digital watermark information in data that has been encoded or quantized, by way of example.

BACKGROUND OF THE INVENTION

Recent advances in computers and network-related technologies have been significant and multimedia information, which is a variety of information such as text, video and audio, is now being handled by computers and exchanged over networks. Since the amount of data involved in video and audio is comparatively large, processing is applied to encode and compress the data, thereby reducing the amount of data. By thus compressing image data and the like, more information can be transmitted to other devices at high speed via a network. The JPEG scheme, which compresses multivalued still images in compliance with ITU-T Recommendation T.81, is in wide use as an image compression technique. However, the standardization of JPEG 2000, etc., is being studied with a view to high-performance compression.

In the JPEG scheme, encoding that uses a discrete cosine transform (DCT) is fundamental. In JPEG 2000, a scheme that employs a discrete wavelet transform is effective.

FIGS. 7A and 7B are block diagrams illustrating the basic structures of a compression apparatus and an expansion apparatus, respectively. Specifically, as illustrated in FIG. 7A, an encoding apparatus compliant with ordinary JPEG and JPEG 2000 generally comprises a frequency transformation unit 701 for implementing a discrete cosine transform or discrete wavelet transform, a quantizer 702 and an entropy encoder 703, etc. On the other hand, as illustrated in FIG. 7B, an ordinary expansion apparatus compliant with JPEG or JPEG 2000 comprises an entropy decoder 704, a dequantizer 705 and an inverse frequency transformation unit 706, etc.

Since video or audio utilized by a computer or network is data that has been digitized, the environment thereof is such that the data can be reproduced with ease and the quality of the data is almost undiminished by such reproduction. For this reason, processing for embedding copyright information as a digital watermark in digital data such as images and voice is executed in order to protect the copyright of the digital data. By extracting the digital watermark from the digital data, it is possible to obtain the embedded copyright information to thereby discover and prevent the unauthorized reproduction of the data.

Known methods of embedding a digital watermark include a method utilizing a discrete cosine transform, a method utilizing a discrete Fourier transfer and a method utilizing a discrete wavelet transform, by way of example.

FIGS. 8A and 8B are block diagrams illustrating the basic structures of an ordinary digital watermark embedding apparatus and extracting apparatus, respectively. In general, as shown in FIG. 8A, the ordinary digital watermark embedding apparatus includes a frequency transformation unit 801 for implementing a discrete cosine transform or discrete wavelet transform, a digital watermark embedding unit 802 for performing quantization in accordance with information for embedding a frequency component, and an inverse frequency transformation unit 803, etc. On the other hand, as shown in FIG. 8B, the ordinary digital watermark extracting apparatus includes a frequency transformation unit 804, and a digital watermark extracting unit 805 for extracting embedded information from a quantized frequency component. Japanese Patent Application Laid-Open No. 2000-151411 (Patent Reference 1) and Japanese Patent Application Laid-Open No. 2000-151973 (Patent Reference 2) have been disclosed as examples of the prior art relating to this application.

In a case where image data is subjected to digital watermark embedding processing using the above described digital watermark embedding apparatus and to compression processing using the above-described compression apparatus, it is easy to apply the compression processing to the image data in which a digital watermark has been embedded. However, it is difficult to embed a digital watermark in compressed image data without expanding the data, apply compression processing again and output the result as image data.

FIG. 9 is a block diagram illustrating the basic structure of an information processing apparatus for subjecting compressed data to digital watermark embedding processing and compression processing. More specifically, as shown in FIG. 9, an image x is compressed by a frequency transformation unit 902, a quantizer 903 and an entropy encoder 904. This is followed by temporarily restoring the image data by applying expansion using an entropy decoder 905, a dequantizer 906 and an image inverse transformation unit 907. A digital watermark is then embedded by a frequency transformation unit 908, a digital watermark embedding unit 909 and an image inverse transformation unit 910. This output is compressed again by a frequency transformation unit 911, a quantizer 912 and an entropy encoder 913.

In accordance with FIG. 9, only processing by the frequency transformation unit 911, quantizer 912 and entropy encoder 913 will suffice in order to compress an image in which a digital watermark has been embedded. However, in order to embed a digital watermark in compressed data and compress the data again, the series of processing operations executed by the devices from the entropy decoder 905 to the entropy encoder 913 is required.

In actuality, many applications and devices that employ encoding processing such as JPEG encoding processing have already been put into practical use. Examples include devices such as digital cameras and color facsimile machines, still picture transmission systems and still picture processing systems. In these applications and devices, there are many cases where the processing by the frequency transformation unit 902, quantizer 903 and entropy encoder 904 is put into the form of hardware such as an ASICS, etc. Consequently, there is a significant rise in cost in order to additionally furnish such applications and devices, in which the above-described processing has been put into hardware form, with processing for embedding a digital watermark anew before compression and encoding.

Further, in JPEG 2000, the integration of compressive encoding and digital watermarking has not been studied sufficiently. Consequently, as in the case of the JPEG scheme, it is very likely that the aforementioned problem will arise, namely difficulty in embedding a digital watermark in compressed encoded data.

SUMMARY OF THE INVENTION

Accordingly, an object of the present invention is to provide an information processing apparatus, method, program and storage medium whereby prescribed additional information such as a digital watermark can be embedded directly in encoded data, and later extracted, without decoding data that has been compressed and encoded by the JPEG scheme, etc.

According to the present invention, the foregoing object is attained by providing an information processing apparatus for embedding a digital watermark in information, comprising: input means for inputting code data, which is information that has been encoded and is partitioned into a plurality of blocks; selecting means for selecting at least one block out of the blocks; and embedding means for embedding a digital watermark, for selected block, by replacing the code data with different code data using a prescribed transformation table.

Further, according to the present invention, the foregoing object is attained by providing an information processing apparatus for embedding a digital watermark in information, comprising: input means for inputting code data, which is information that has been encoded and is partitioned into a plurality of blocks; selecting means for selecting at least one block out of the blocks; and extracting means which, when a digital watermark has been embedded in the code data, is for extracting the embedded digital watermark, for selected block, using a transformation table that was used when the digital watermark was embedded.

According to the present invention, the foregoing object is attained by providing an information processing method for embedding a digital watermark in information, comprising: an input step of inputting code data, which is information that has been encoded and is partitioned into a plurality of blocks; a selecting step of selecting at least one block out of the blocks; and an embedding step of embedding a digital watermark, for selected block, by replacing the code data with different code data using a prescribed transformation table.

Further, according to the present invention, the foregoing object is attained by providing an information processing method for extracting a digital watermark from information, comprising: an input step of inputting code data, which is information that has been encoded and is partitioned into a plurality of blocks; a selecting step of selecting at least one block out of the blocks; and when a digital watermark has been embedded in the code data, an extracting step of extracting the embedded digital watermark, for selected block, using a transformation table that was used when the digital watermark was embedded.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIGS. 2A and 2B are diagrams illustrating examples of transformation tables used when code transformation processing is executed by a code transformation unit;

FIG. 4 is a diagram illustrating an example of a transformation table using key information in a second embodiment of the present invention;

FIGS. 7A and 7B are block diagrams illustrating the basic structures of a compression apparatus and expansion apparatus, respectively;

FIG. 10 is a diagram illustrating an example of a quantization table for quantizing color difference components;

FIG. 11 is a diagram illustrating an example of a Huffman table for AC coefficients used in Huffman encoding;

DETAILED DESCRIPTION OF THE PREFERRED EMBODIMENTS

An information processing apparatus for executing image processing according to embodiments of the present invention will now be described with reference to the drawings. In the embodiments, the present invention will be described taking as an example an information processing apparatus for subjecting digital image data to compression processing and processing for embedding a digital watermark, thereby protecting copyright, preventing the altering of images and printing various information.

<JPEG Encoding>

This embodiment will be described with regard to an example in which digital watermark information is embedded in JPEG-encoded compressed data. Accordingly, JPEG compression processing, which uses the ordinary compression apparatus shown in FIG. 7A, will be described first with regard to the procedure of JPEG encoding processing.

First, the frequency transformation unit 701 partitions still-picture data to be encoded into blocks of 8×8 pixels and implements a DCT (Discrete Cosine Transform) block by block. An 8×8 pixel block that has undergone the DCT shall be referred to as a "DCT coefficient block", each coefficient contained in the DCT coefficient block shall be referred to as a "DCT coefficient", and a set of DCT coefficient blocks that constitutes one image shall be referred to as a "group of DCT coefficient blocks".

Next, the quantizer 702 quantizes the group of DCT coefficient blocks using any quantization table. A quantized DCT coefficient block shall be referred to as a "quantized DCT coefficient block", and a set of quantized DCT coefficient blocks that constitutes one image shall be referred to as a "group of quantized DCT coefficient blocks".

Next, the entropy encoder 703 subjects the group of quantized DCT coefficient blocks to Huffman encoding. The data that has undergone this Huffman encoding becomes JPEG data. It should be noted that a Huffman table used at this time may be a table prepared in advance or a table created whenever an image is compressed. The JPEG data includes the Huffman-encoded data, the quantization table that was used at the time of compression and the Huffman table.

A quantized DCT coefficient block is obtained by dividing a DCT coefficient block by a value determined by the quantization table. FIG. 10 is a diagram illustrating an example of a quantization table for quantizing color difference components. As shown in FIG. 10, the quantization table is applied to a 8×8 DCT coefficient block, by way of example. This quantization table is so adapted that more bits are allocated to low-frequency components and fewer bits to high-frequency components. Accordingly, if a DCT coefficient is −36 and the corresponding value of the quantization table is 18, for example, then the quantized DCT coefficient will be −2. However, if the corresponding value of the quantization table is 99, then the quantized DCT coefficient will be zero.

Figure 6:
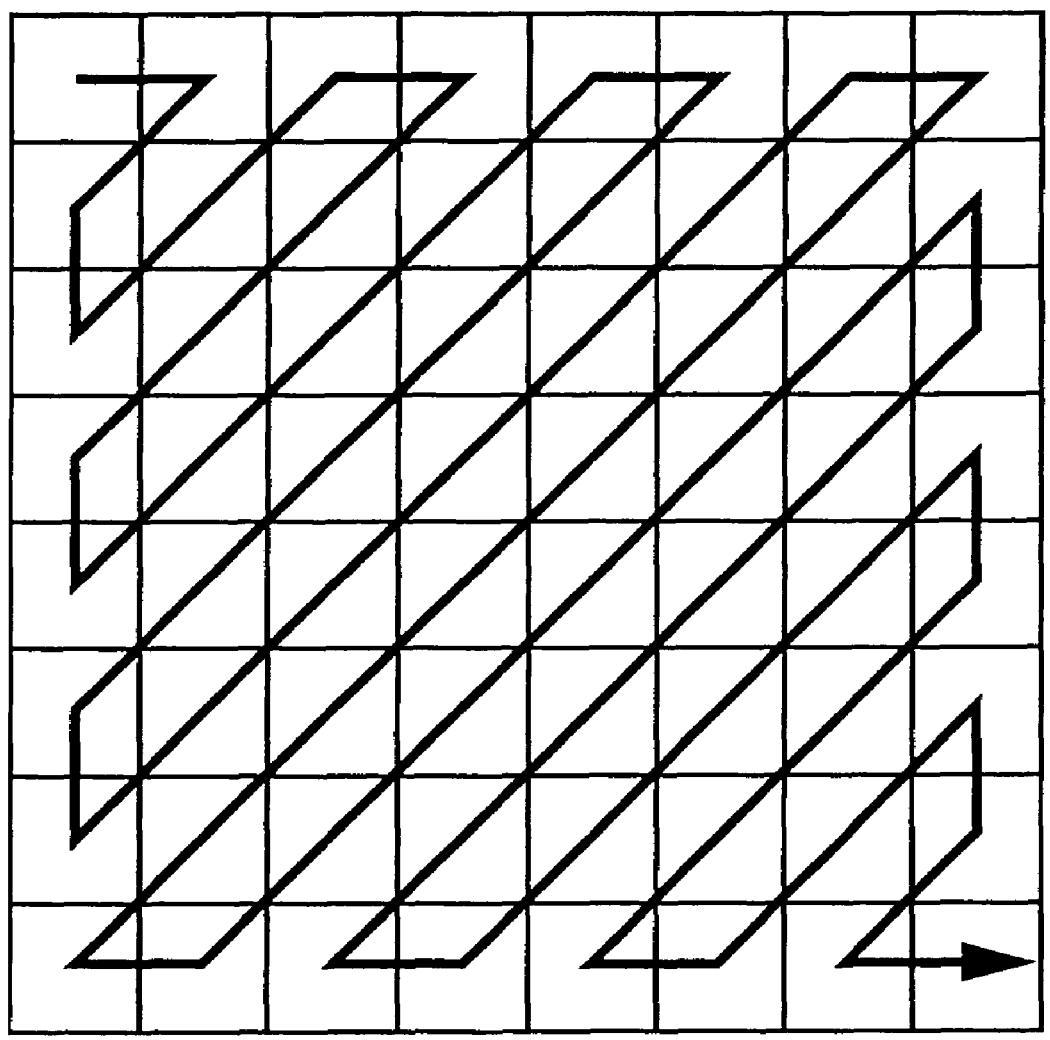
FIG. 6 is a diagram useful in describing a zigzag scan.

Further, the quantized DCT coefficients included in the quantized DCT coefficient block are divided into DC and AC coefficients which are then Huffman-encoded separately. More specifically, a DC coefficient is converted to a difference between itself and the DC coefficient of the immediately preceding quantized DCT coefficient block and is encoded using a table for DC coefficients. On the other hand, AC components are rearranged in the order of a zigzag scan of the kind shown in FIG. 6 and are encoded using a table obtained by combining lengths of successive zero coefficients (run lengths) and coefficient values other than zero. That is, FIG. 6 is a diagram useful in describing the zigzag scan.

Further, FIG. 11 is a diagram illustrating an example of a Huffman table for AC coefficients used in Huffman encoding. With Huffman encoding, the AC coefficients are classified into groups in accordance with the values thereof using the table of FIG. 11, and each group is assigned a code that conforms to the run length. For example, when the AC coefficient is −2, the coefficient is classified into Group 2. If the run length at this time is zero, a code "01" is assigned. It should be noted that if an additional bit for distinguishing an AC coefficient within a group is "01", then the AC coefficient "−2" will be represented by "0101".

<Structure of JPEG Data>

Figure 5:
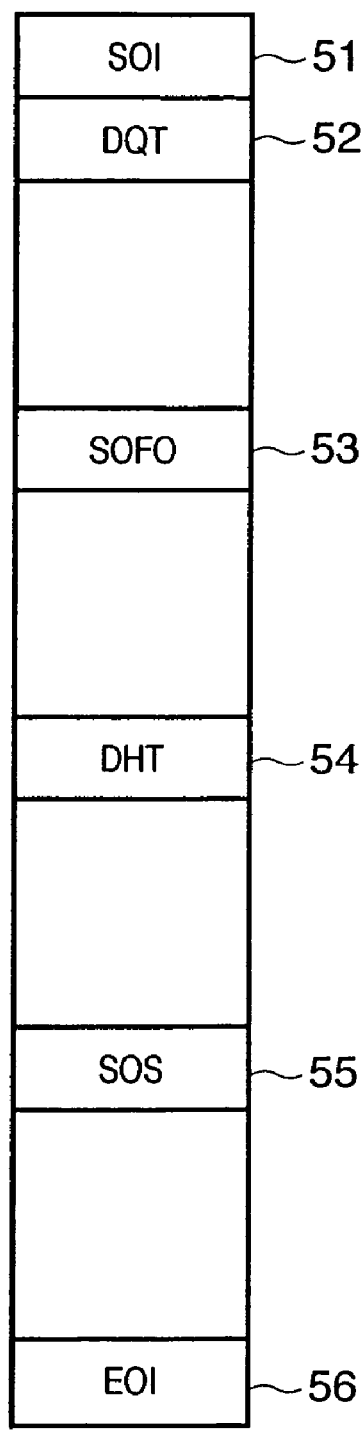
FIG. 5 is a diagram illustrating an example of the structure of JPEG data.

FIG. 5 is a diagram illustrating an example of the structure of JPEG data. FIG. 5 shows an example of the structure of data that has been compressed by a sequential scheme according to JPEG. The sequential scheme refers to a scheme in which when a compressed image is decoded, the original image is reproduced in order starting from the upper side of the image. By contrast, a scheme in which after the entirety of the image is displayed initially without sharpness, the image gradually becomes sharper is referred to as a "progressive" scheme. Which of these schemes is used is decided by the Huffman encoding method in the entropy encoder 703 shown in FIG. 7A.

As shown in FIG. 5, the JPEG data is formatted by unique 2-byte codes, which are referred to as "markers", in the data. First, an initial SOI marker 51 represents the start of the JPEG data. A DQT marker field that follows the SOI marker 51 defines the quantization table. In the DQT marker field, the quantization table that was used at the time of compression is included to follow a DQT marker 52.

A SOF0 marker field that follows the DQT marker field is used in the case of JPEG data that has been compressed by the sequential scheme using a DCT. Included in the SOF0 marker field following a SOF0 marker 53 are parameters that prevailed at the time of compression, namely the image size of the compressed image, the sampling rate and the number of components, and the quantization-table identifier of every component.

A DHT marker field that follows the SOF0 marker field defines the Huffman table. Included in the DHT marker field following a DHT marker 54 is the Huffman table that was used at the time of compression. The DHT marker field is followed by an SOS marker field that contains the Huffman code of the image that has been encoded. Included in the SOS marker field to follow an SOS marker 55 is the Huffman code of the encoded image after the addition of a header of a number of bytes containing information such as the identifier of each component placed in the Huffman table. Finally, an EOI marker 56 indicates the end of the JPEG data.

It should be noted that the order of the markers is not necessarily limited only to the order shown in FIG. 5 and that two or more of the same markers or marker areas may exist.

<Decoding of JPEG Data>

Next, the procedure for decoding the JPEG data that has been compressed by the procedure set forth above will be described using the compression apparatus shown in FIG. 7B.

In the processing for decoding JPEG data, Huffman code is decoded to a group of quantized DCT coefficient blocks by the entropy decoder 704 using the Huffman table in the JPEG data. Next, the group of quantized DCT coefficient blocks is dequantized to a group of DCT coefficient blocks by the dequantizer 705 using the quantization table in the JPEG data. Next, an IDCT (Inverse DCT) is applied to the group of DCT coefficient blocks by the inverse frequency transformation unit 706, whereby 8×8-pixel blocks are reproduced and the image reconstructed. This procedure makes it possible to obtain image data decoded from the JPEG data.

<Embedding of Digital Watermark>

Figure 8A:
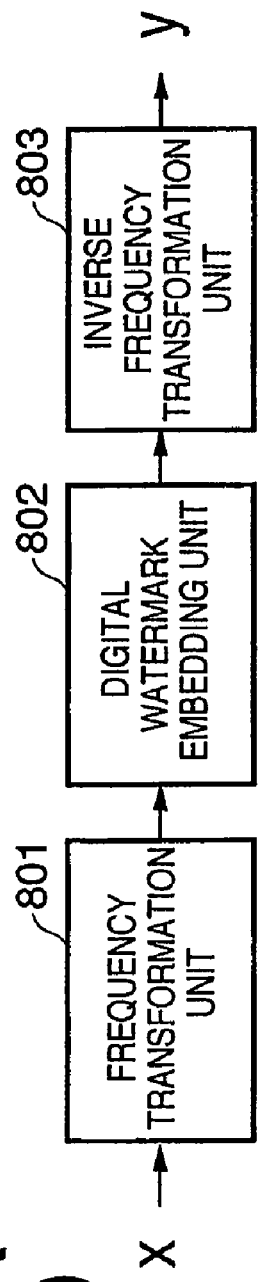
FIGS. 8A and 8B are block diagrams illustrating the basic structures of an ordinary digital watermark embedding apparatus and extracting apparatus, respectively.
Figure 8B:
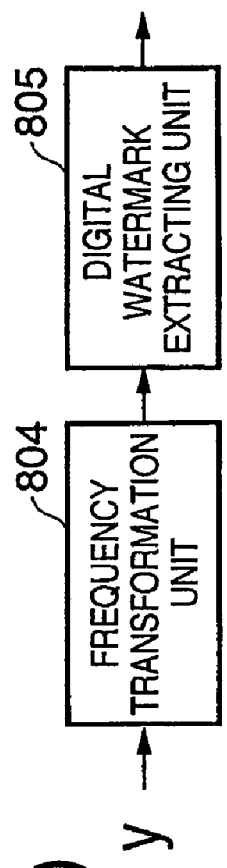

Processing for embedding a digital watermark will be described using the digital watermark embedding apparatus shown in FIG. 8A. It should be noted that the digital watermark embedding processing described in this embodiment is implemented by manipulating a DCT coefficient block. More specifically, the embedding of a digital watermark is executed through the following processing:

First, the input image is subjected to a DCT in the frequency transformation unit 801. Next, the digital watermark embedding unit 802 selects one or more DCT coefficient blocks for embedding of a digital watermark (such a block shall be referred to as an "embed block") from among the group of DCT coefficient blocks, and embeds one bit, which constitutes a digital watermark, in each of the embed blocks selected. Furthermore, the DCT coefficients for embedding of the bits are selected randomly from among comparatively low-frequency coefficients with the exception of the DC coefficients in the embed blocks.

The embedding of the digital watermark is completed by quantizing the embed blocks. It should be noted that the size of the quantization step at this time corresponds to the strength of embedding.

Here an example in which a bit (referred to as an "embed bit") "0" or "1" for embedding a digital watermark is embedded will be illustrated. First, a value q obtained by quantizing $s\{u0,v0\}$ is obtained according to Equation (1) below.

$$q = <<s\{u0,v0\}/h>>h \quad (1)$$

where $s(u0,v0)$ is the value of the DCT coefficient, h represents the strength of embedding and $<<x>>$ is the largest integer that does not exceed x.

A value c that satisfies Equation (2) or (3) below is made the DCT coefficient after the embedding of the digital watermark. That is, we have the following:

if embed bit is "0": $c = q + h/4$ (2)

if embed bit is "1": $c = q + 3h/4$ (3)

Finally, the output of the digital watermark embedding unit 802 is subjected to an inverse transform by the inverse frequency transformation unit 803.

First Embodiment

Figure 1A:
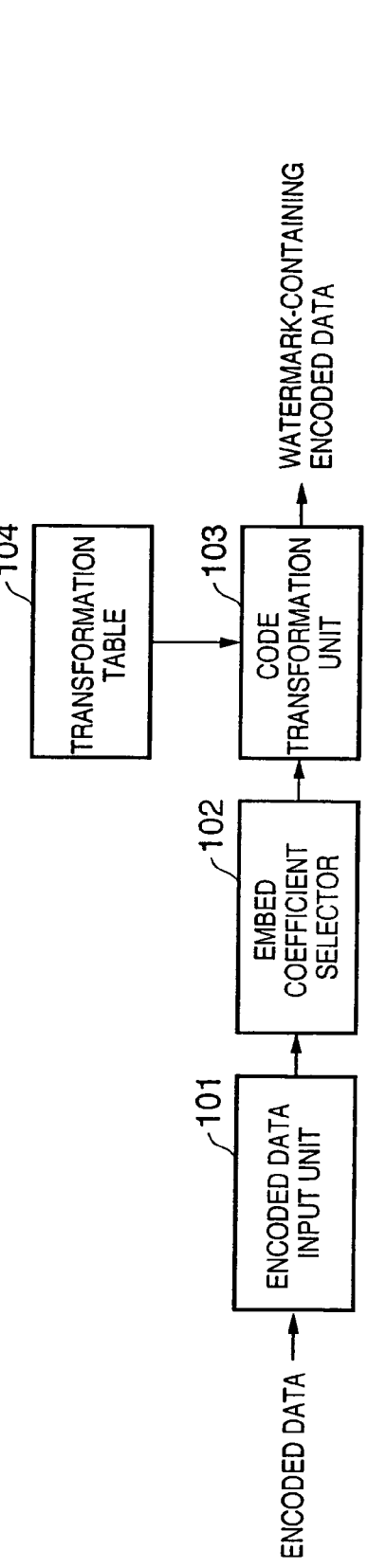
FIG. 1A is a block diagram illustrating an example of the structure of an image processing apparatus according to a first embodiment of the present invention.
Figure 13:
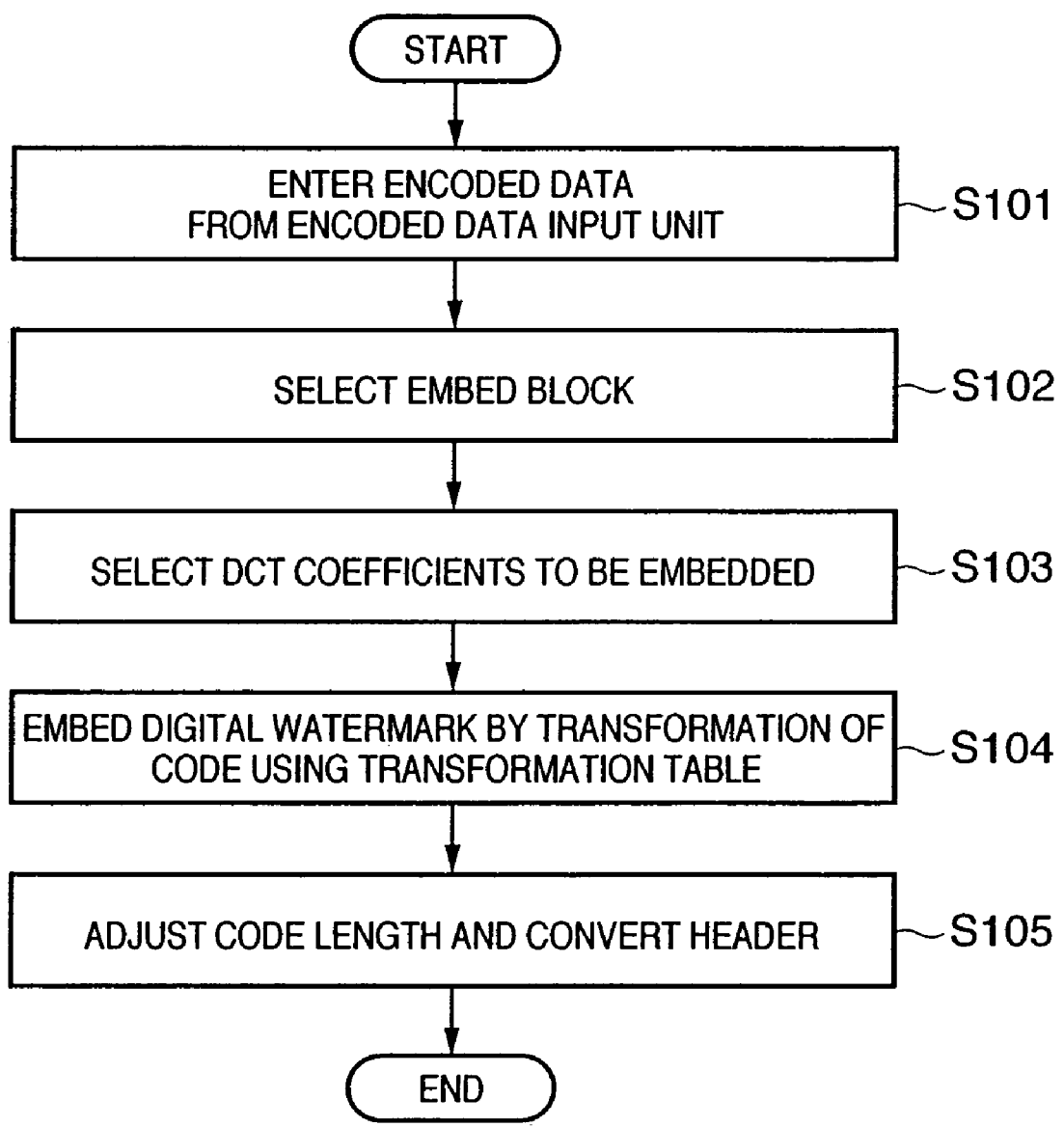
FIG. 13 is a flowchart useful in describing processing for embedding a digital watermark by the image processing apparatus according to the first embodiment.

FIG. 1A is a block diagram illustrating an example of the structure of an image processing apparatus according to a first embodiment of the present invention. Further, FIG. 13 is a flowchart useful in describing processing for embedding a digital watermark by the image processing apparatus according to the first embodiment. As shown in FIG. 1A, encoded data enters the image processing apparatus of this embodiment from an encoded data input unit 101 (step S101). In the description that follows, JPEG data will be taken as an example of the encoded data that enters. Further, the JPEG data that enters may be stored beforehand on various storage media (not shown) connected to a hard disk, CD drive, DVD drive or FDD drive, etc., or may be transmitted from another apparatus via a network (not shown).

Next, embed blocks are selected by an embed coefficient selector 102 from the Huffman-encoded data that follows the SOS marker 55 of the JPEG data shown in FIG. 5 (step 102). The embed coefficient selector 102 further selects DCT coefficients, which are for embedding embed bits, from among comparatively low-frequency coefficients with the exception of the DC coefficients in the embed blocks (step S103). Since the order of the DCT coefficients is decided by the zigzag scan shown in FIG. 6, the selection of the coefficients in the embed coefficient selector 102 is performed uniquely.

Next, a code transformation unit 103 embeds the digital watermark by applying a code transformation directly to the selected embed block using a transformation table 104, described later (step S104). FIGS. 2A and 2B are diagrams illustrating examples of transformation tables used when code transformation processing is executed by the code transformation unit 103. For example, if the selected embed block is "0101" and the embed bit is "1", then this block is directly replaced with "0100" by the transformation table shown in FIG. 2A.

The procedure for creating the transformation table 104 will now be described. As mentioned above, the embedding of a digital watermark is completed by quantizing an embed block. This means changing the value of the original DCT coefficient. The value of the original DCT coefficient is obtained by decoding the code data using a Huffman table and a quantization table. The DCT coefficient changed by the embedding of the digital watermark is encoded using the same Huffman table and quantization table again.

By way of example, if the code data corresponding to a selected DCT coefficient is "0101", a quantization value of −2 is obtained using the Huffman table. If the value in the quantization table corresponding to this DCT coefficient is 18, then the value of the original DCT coefficient will be −36.

FIGS. 12A to 12D are diagrams useful in describing an example of processing for embedding a digital watermark. If we assume that the quantization step is h=18, then quantization intervals and quantization representative values can be defined on the vertical lines shown in FIG. 12A. In the example shown in FIG. 12A, 0, 18, 36, 54 are quantization representative values at the respective quantization intervals.

Figure 12A:
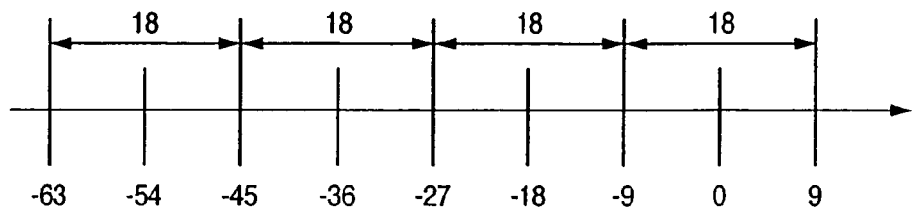
FIGS. 12A to 12D are diagrams useful in describing an example of processing for embedding a digital watermark.
Figure 12B:
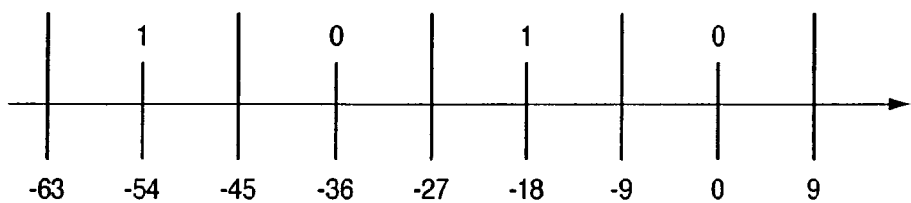
Figure 12C:
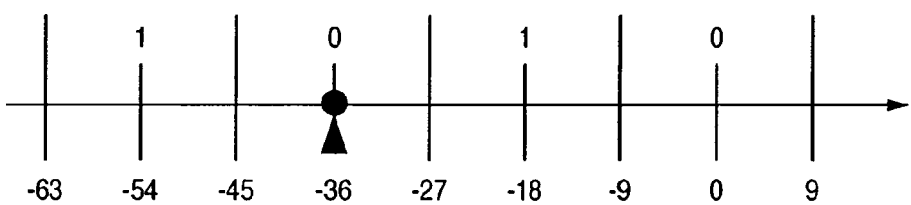

In this embodiment, bits "0" and "1" are assigned to the quantization intervals defined above, as illustrated in FIG. 12B. Usually, in a case where a watermark is not embedded, the calculated value −36 of the original DCT coefficient is rounded off to the quantization representative value using Equation (1) cited above, as illustrated in FIG. 12C.

Figure 12D:
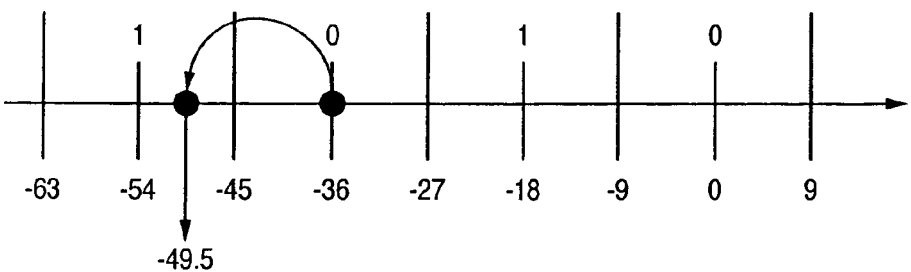

A digital watermark is embedded in the value −36, which has been rounded off to the quantization representative value, using Equation (2) or (3) cited above. For example, if bit "1" is embedded in −36 at an embedding strength h=18, then C=−49.5 is calculated using Equation (3), as shown in FIG. 12D. A quantized DCT coefficient −3 is obtained from quantization by the same quantization table. Furthermore, code "01" is obtained from the same Huffman table.

It should be noted that if an additional bit for distinguishing an AC coefficient in the group is "00", then the code will be represented by "0100". That is, by rewriting the code "0101" to "0100", the embedding of the digital watermark is achieved. Further, in a case where the embed bit "0" is embedded, c=−40.5 is obtained from Equations (1) and (3) if the embedding strength is made h=18.

From quantization based upon the same quantization table, the quantized DCT coefficient −2 is obtained. Since the quantized DCT coefficient −2 obtained is the same as the original quantized DCT coefficient, the code data with respect to the embed bit "0" becomes "0101", which is the same as the original code data. Accordingly, the digital watermark can be embedded by replacing the code data "0101" directly with "0100" or "0101" in accordance with the embed bit using the transformation table shown in FIG. 2A in which "0100" is written as the digital-watermark-containing code data in a case where a digital watermark "1" is embedded in the code data "0101", and "0101" is written as the digital-watermark-containing code data in a case where a digital watermark "0" is embedded in the code data "0101".

This embodiment has been described with regard to a case where the code data is "0101". However, it is obvious that watermark-containing code data corresponding to code data can be created in accordance with an embed bit by a similar technique with regard to other code data as well.

It should be noted that in a case where the code lengths of the input code data and output code data of the transformation table change owing to embedding of a digital watermark, processing for adjusting code length is performed when the output code data is replaced by the portion of the code data of the input (step S105). For example, if the scheme is JPEG, then, in a case where the AC coefficient is 3 and run length is 0, the Huffman coefficient will be "01" and the value representing 3 will be "11". The result, therefore, will be "0111". If "1" is embedded in this AC coefficient by similar processing, the AC coefficient will be 4 and therefore the Huffman code will be "100". Since the value representing 4 is "100", we have "100100". In this case, the output code data is replaced with the portion of the input code data of the transformation table. However, since the code lengths of the input code data and output code data change from four bits to six bits, processing for shifting the ensuing code sequence by two bits is executed. This processing is executed by the transformation table 104 of FIGS. 1A and 1B.

Further, if the code sequence is not compliant with JPEG, e.g., if the data is such that the code length has been written in the header, as in JPEG 2000, processing for converting the header is executed (step S105). According to JPEG 2000, the length (LCB) of the offset of a code block (CB) from a packet header (PH) in the result of Huffman encoding is written in the packet header (see 15c in FIG. 15). That is, the fact that the offset with respect to CB2 is LCB2 and that the offset with respect to CB3 is LCB3, etc., is described in the PH (since the offset with respect to CB1 is zero, there is no LSB1).

Figure 1B:
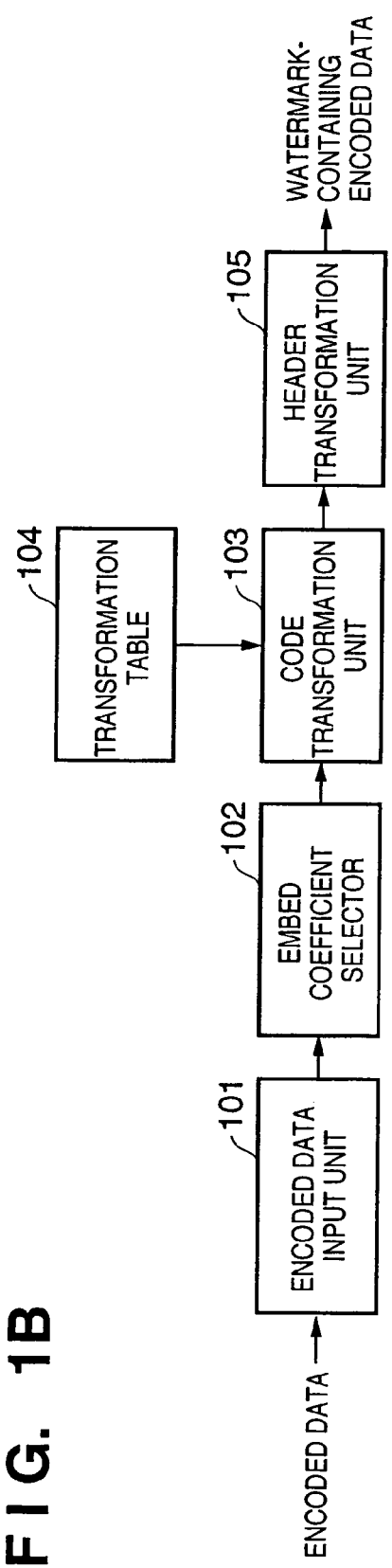
FIG. 1B is a block diagram illustrating an example of the structure of an image processing apparatus for converting a header according to the first embodiment of the present invention.
Figure 15:
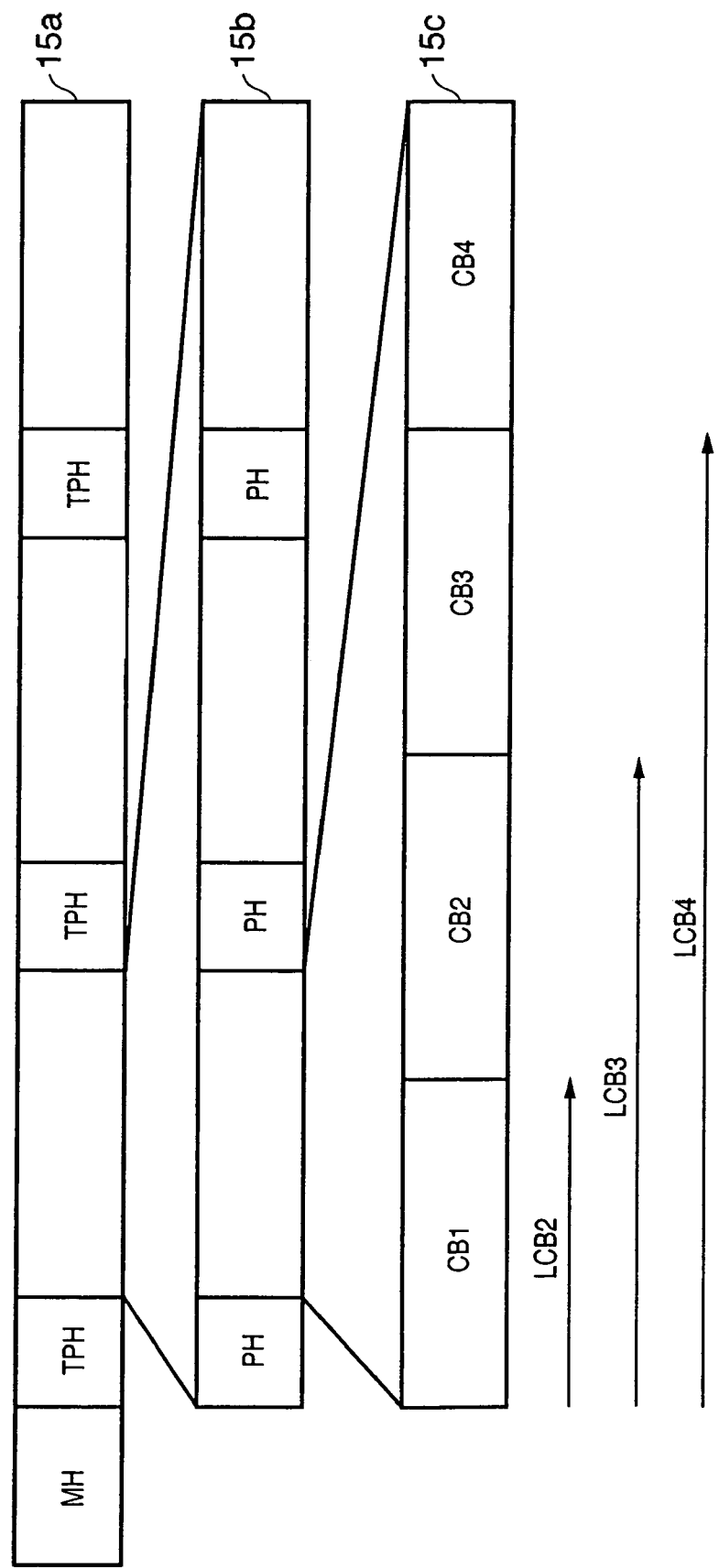
FIG. 15 is a diagram illustrating an example of the structure of data according to JPEG 2000.

Accordingly, in a case where the length of a code block changes owing to digital watermarking by the above-described principle, it is necessary to rewrite also each LCB value within the PH. In this case, the adjustment of code length at step S105 includes rewriting of each LSB data within the PH in addition to shifting of the code sequence. Further, this processing is executed by a header transformation unit 105 shown in FIG. 1B. More specifically, FIG. 1B is a block diagram illustrating an example of the structure of an image processing apparatus for converting a header according to the first embodiment of the present invention. In FIG. 15, reference characters 15a represent data compliant with JPEG 2000, MH the main header of the data and TPH a tile part header. The space between the tile part headers TPH represents tile part data. Reference characters 15b in FIG. 15 represent the content of tile part data, and PH a packet header. The space between the packet headers PH represents packet data.

Figure 9:
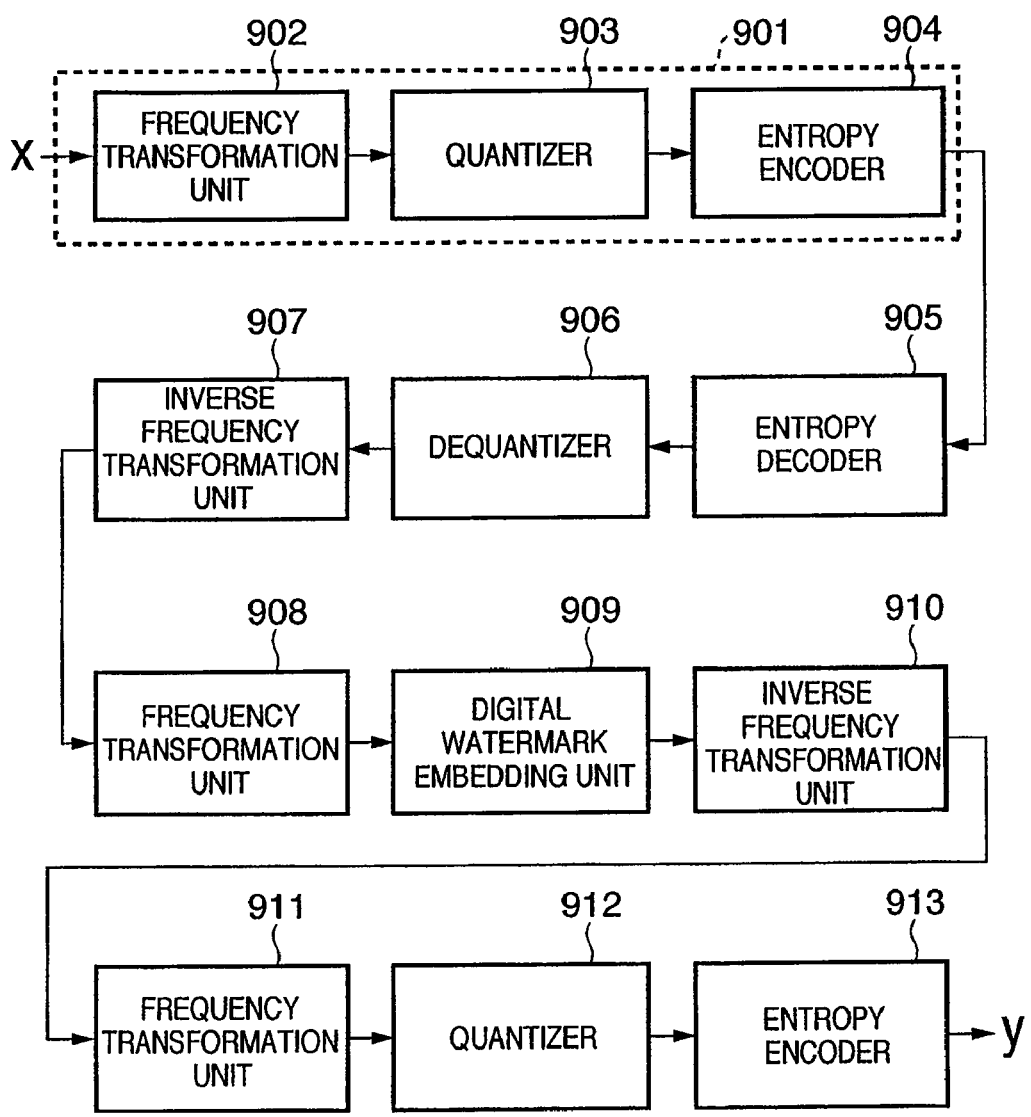
FIG. 9 is a block diagram illustrating the basic structure of an information processing apparatus for subjecting compressed data to digital watermark embedding processing and compression processing.

Thus, in accordance with this embodiment, JPEG data is rewritten using a transformation table of watermark-containing code data vs. original code data. As a result, it is possible to implement the direct embedding of a digital watermark in JPEG data without requiring the processing executed using devices from the entropy decoder 905 to the entropy encoder 913 in the block diagram of FIG. 9.

Second Embodiment

An image processing apparatus according to a second embodiment of the present invention will now be described. Structural components the same as or substantially the same as those of the first embodiment are designated by like reference characters and need not be described again in detail.

In the first embodiment described above, an example in which a digital watermark is embedded by manipulating the values of DCT coefficients of embed blocks has been described. The second embodiment will be described with regard to direct code transformation processing that corresponds to a method of embedding a digital watermark by manipulating values of quantized DCT coefficients of quantized DCT coefficient blocks. Direct embedding of a digital watermark in code data by code transformation is performed using the arrangement of FIG. 1A or 1B in the second embodiment as well. Further, the only difference from the image processing apparatus of the first embodiment is the correspondence tables used in the transformation tables shown in FIGS. 2A and 2B. More specifically, the transformation table of FIG. 2B is used instead of the transformation table of FIG. 2A.

In digital watermark embedding processing for manipulating the values of quantized DCT coefficients, consideration will be given to a technique in which an embed bit "1" is indicated when the value of a quantized DCT coefficient is an even number and an embed bit "0" is indicated when the value of a quantized DCT coefficient is an odd number. That is, in a case where an embed bit "0" is embedded in code data "0101", the value of the quantized DCT coefficient corresponding to the code is an even number of −2 and therefore a change is made to −3, which is the nearest odd number, and the code "0101" is rewritten to "0100" in accordance with this odd number. It should be noted that in a case where the embed bit "1" is embedded in code data "0101", the code data remains as is. Thus, according to this embodiment, direct transformation of the code data to code data that contains a digital watermark can be implemented by the transformation table shown in FIG. 2B.

Further, the present invention can be applied also to an embedding technique that uses key data. For example, it is possible to adapt the embedding technique in such a manner that code data is replaced with code data containing a digital watermark using a transformation table in which embed bits are decided by a quantized DCT coefficient and key data, without making a determination regarding even and odd numbers of quantized DCT coefficients. FIG. 4 is a diagram illustrating an example of a transformation table using key information in the second embodiment of the present invention. For example, in a case where a determination is made based upon whether the result of adding a quantized DCT coefficient and key data is even or odd, if key data k0 shown in FIG. 4 is an even number and key data k1 is an odd number, code data containing a digital watermark in case of k0 and code data containing a digital watermark in case of k1 will be in reverse correspondence.

This embodiment has been described with regard to a case where the code data is "0101". However, it is obvious that watermark-containing code data corresponding to code data can be created in accordance with an embed bit by a similar technique with regard to other code data as well. Further, in a case where code length changes owing to embedding of a digital watermark, adjustment of code length and, if necessary, header conversion, is performed in a manner similar to that of the first embodiment.

Thus, in accordance with this embodiment, JPEG data is directly rewritten using a transformation table of watermark-containing code data vs. original code data. As a result, it is possible to implement the embedding of a digital watermark in JPEG data.

Third Embodiment

An image processing apparatus according to a third embodiment of the present invention will now be described. Structural components the same as or substantially the same as those of the first embodiment are designated by like reference characters and need not be described again in detail.

The first and second embodiments have been described with regard to a case where a digital watermark is embedded in encoded compressed data, such as JPEG data, obtained as a result of using a discrete cosine transform. Further, it is obvious that the present invention is similarly applicable not only with regard to a discrete cosine transform but also with regard to various predetermined frequency transforms that include a discrete wavelet transform, discrete Fourier transform and predictive encoding. The reason for this is that the present invention essentially is independent of image transforms such as the discrete cosine transform and manipulates compressed data, which has been compressed in accordance with a predetermined algorithm, in accordance with a predetermined digital watermark embedding algorithm.

More specifically, it is obvious that when there is an algorithm 1 for encoding an image and an algorithm 2 for embedding a digital watermark in the image, all or part of the selected image is encoded using algorithm 1 to thereby obtain a code block, the digital watermark is inserted into the same part of the image or into the entire image of this code block using algorithm 2, and a correspondence table of a code block that is obtained by performing encoding using algorithm 1 can be uniquely determined and created beforehand in accordance with the digital watermark information to be embedded.

Furthermore, a digital watermark embedding technique according to the present invention is not limited to the JPEG data shown in FIG. 5. If information such as a table that was used in performing compression can be uniquely specified, the invention can be applied to the embedding of a digital watermark regardless of the format of the encoded compressed data.

With regard to JPEG 2000 that is currently being implemented in standardization operations, a compression apparatus has a structure of the kind shown in FIG. 7A and is such that a discrete wavelet transform is effective for use in the frequency transformation unit and entropy encoding, inclusive of Huffman encoding, is effective as the encoding scheme. Accordingly, with regard to a digital watermark embedding technique that manipulates discrete wavelet coefficients, it is obvious that a digital watermark embedding apparatus that supports JPEG 2000 can be implemented by the apparatus of the first and second embodiments, described with reference to FIG. 1B.

In each of the foregoing embodiments, image data is described as the target for the embedding of a digital watermark. However, it is obvious that application of the embodiments is not limited to still pictures and that the invention can be applied to moving-picture data such as MPEG-compliant data and to voice and other sound data.

Fourth Embodiment

An image processing apparatus according to a fourth embodiment of the present invention will now be described. Structural components the same as or substantially the same as those of the first embodiment are designated by like reference characters and need not be described again in detail.

Figure 3:
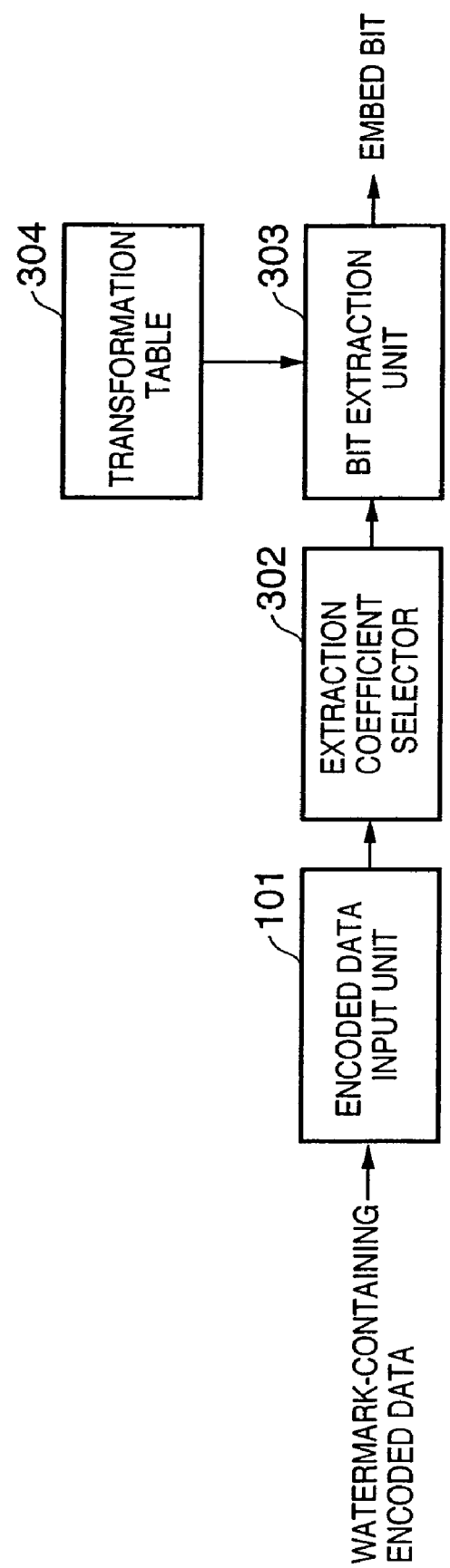
FIG. 3 is a block diagram illustrating an example of the structure of an image processing apparatus according to a fourth embodiment of the present invention.
Figure 14:
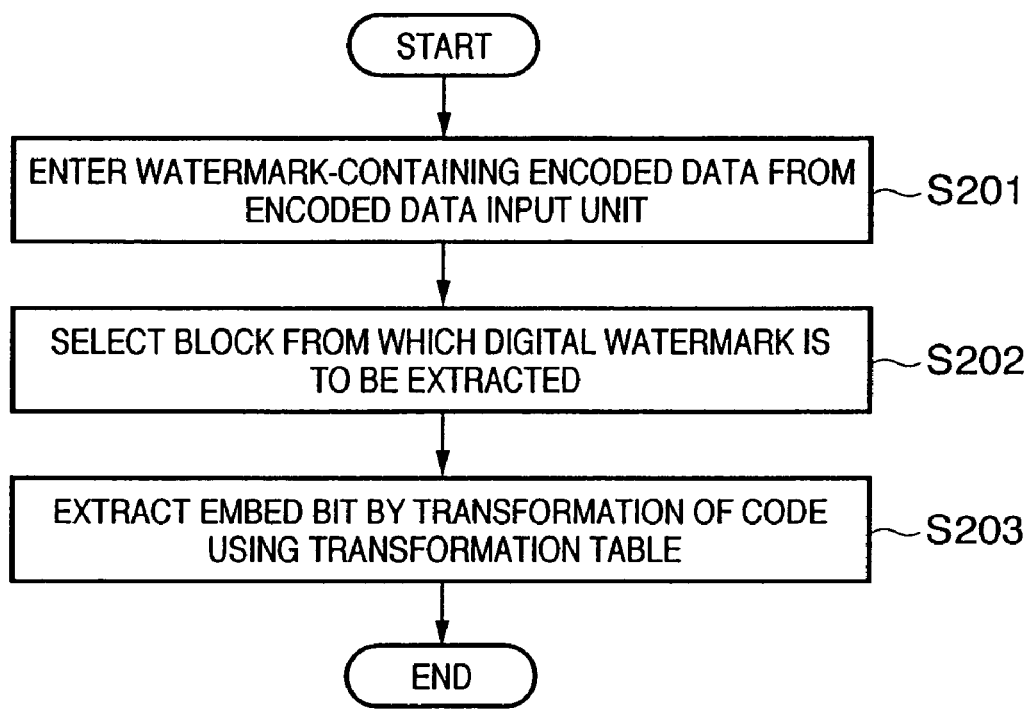
FIG. 14 is a flowchart useful in describing processing for extracting a digital watermark by the image processing apparatus according to the fourth embodiment.

This embodiment will be described with regard to a method of extracting an embedded digital watermark from compressed data in which the digital watermark has been embedded. FIG. 3 is a block diagram illustrating an example of the structure of an image processing apparatus according to the fourth embodiment of the present invention, and FIG. 14 is a flowchart useful in describing processing for extracting a digital watermark by the image processing apparatus according to the fourth embodiment.

In the image processing apparatus shown in FIG. 3, encoded data containing a digital watermark is input to the code data input unit 101 (step S201). Next, selection of an extraction block, which is a block from which the digital watermark is to be extracted, is performed by an extraction coefficient selector 302 that executes processing similar to that of the embed coefficient selector 102 described in the first embodiment (step S202).

In a case where digital watermark information is to be extracted from the extraction block selected, a bit extraction unit 303 employs a transformation table 304, which was used in embedding the digital watermark, to determine whether the value of JPEG data in an extraction block corresponds to "1" or "0" (step S203). It is obvious that this processing is implemented by performing a reverse correlation employing the transformation table that was used in embedding the digital watermark.

More specifically, when a digital watermark is embedded, code data and an embed bit are used as the input of the transformation table and code data that contains the digital watermark is output from the table. On the other hand, when a digital watermark is to be extracted, code data containing the digital watermark and code data are used as the input of a transformation table and an embed bit is output from the table. For example, if code data "0101" corresponding to the same position as the code data "0100" containing the digital watermark is input in a case where a transformation table corresponding to the first embodiment shown in FIG. 2A has been used, the embed bit "1" is output. If code data "0101" corresponding to the same position as the code data "0101" containing the digital watermark is input, then the embed bit "0" is output.

When the processing described above is executed, it is required that the original code data be available. In a case where a quantized DCT coefficient of code data containing a watermark is found and the embed bit is uniquely decided depending upon whether the value of the coefficient is even or odd, as in the second embodiment, the apparatus need not have the original code data. That is, in this case the embed bit can be output merely by inputting the watermark-containing code data of the transformation table.

Further, in a case where use has been made of the key data illustrated in the second embodiment, i.e., in a case where embedding has been performed by the transformation table illustrated in FIG. 4, extraction is performed in similar fashion using the transformation table of FIG. 4. Since the transformation table shown in FIG. 4 is obtained from the result of adding the embed bit and key data, the embed bit can be extracted by inputting the watermark-containing code data and the key data. Further, in a more complicated case, the embed bit is found by inputting the code data in addition to the watermark-containing code data and key data.

It is obvious that the processing for extracting a digital watermark according to this embodiment supports not only digital watermark embedding processing that uses a discrete cosine transform illustrated in the first and second embodiments but is also capable of similarly supporting digital watermark embedding processing that uses various transforms indicated in the third embodiment.

The image processing apparatus of each embodiment described above is capable of being applied to an image input apparatus such as a digital camera. In this case, even in an instance in which the image compression processing in this image input apparatus has been put into hardware form, it is possible to readily execute digital watermark embedding processing without adding on new hardware so long as digital watermark embedding processing can be implemented by newly supplying a program to the CPU of the apparatus.

Further, unlike data compression processing, digital watermark embedding processing does not necessarily require real-time processing. This means that digital watermark embedding processing can be executed in a case where data is transferred to a personal computer from an image input apparatus such as a digital camera, or in a case where the image input apparatus is not executing image input. By adopting this arrangement, digital watermark embedding processing can be executed in a short time even in a case where the processing capability of the CPU with which the image input apparatus is equipped is low.

Furthermore, it is obvious that the image processing apparatus according to each embodiment described above is capable of being applied to an image input/output apparatus such as a color facsimile machine as well. In this case, embedded digital watermark information can be extracted with facility by incorporating the digital watermark extracting function of the fourth embodiment in an image output apparatus. It should be noted that in a case where controlled information with respect to image output is indicated by embedded digital watermark information, it is also possible to control the image output apparatus in accordance with this controlled information when the digital watermark information is extracted.

Furthermore, it is obvious that the functions described in each of the foregoing embodiments can be applied to a number of systems such as a still-picture transmission system or still-picture processing system having a compression application such as a JPEG application.

In accordance with each of the foregoing embodiments, as described above, digital watermark information can be embedded in compressed data ideally and embedded digital watermark information can be extracted ideally by adding simple processing means to an image processing apparatus having an image compression function.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In accordance with the present invention, digital watermark information can be embedded and extracted without decoding encoded data that has been compressed. Image data is often archived or communicated in a form compressed according to JPEG or JPEG 2000, etc., and not in bitmap form. The present invention makes it possible to implement a labor-free, efficient digital watermark embedding/extracting method that decodes encoded data.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-291512 filed on Oct. 4, 2004, which is hereby incorporated by reference herein.

What is claimed is:

1. An information processing apparatus, comprising:
a table memory which stores combination of plurality of coded data each being a DCT coefficient represented in a Huffman coding method and corresponding bits to be embedded, and a plurality of new coded data each being a new DCT coefficient represented in Huffman coding method;
an input unit which inputs JPEG image data;
a block data acquisition unit which acquires block coded data of one block from the JPEG image data inputted by said input unit;
a first acquisition unit which acquires DCT coefficients represented in Huffman coding method, which are for embedding embed bits, from among comparatively low-frequency coefficients with the exception of DC coefficients in the block coded data acquired by said block data acquisition unit;
second acquisition unit which acquires, referring to said table memory, new DCT coefficients represented in Huffman coding method using the DCT coefficients acquired by said first acquisition unit and the embed bits; and
an updating unit which updates the block coded data by replacing the DCT coefficients acquired by said first acquisition unit with the new DCT coefficients acquired by said second acquisition unit,
wherein in a case where code length of the new DCT coefficients acquired by said second acquisition unit is different from that of the DCT coefficients acquired by said first acquisition unit, said updating unit adjusts code length of the JPEG image data and then updates the block coded data.

2. The apparatus according to claim 1, further comprising creating means for creating the table memory using a first algorithm for encoding an image and a second algorithm for embedding a digital watermark in the image;
wherein said creating means correlates code data, which has been obtained by encoding all or part of an image using the first algorithm, and code data, which has been obtained by encoding all or part of the encoded image using the first algorithm after a digital watermark has been embedded using the second algorithm, and adopts the correlated code data as table memory.

3. The apparatus according to claim 2, wherein said creating means creates table memory in which correlation has been established between (a) code data, which has been obtained by encoding using the first algorithm, and prescribed key information, and (b) code data obtained by encoding using the first algorithm after a digital watermark has been embedded using the second algorithm.

4. An information processing method using a computer to perform the steps of:

providing a table memory which stores combination of plurality of coded data each being a DCT coefficient represented in Huffman coding methods and corresponding bits to be embedded, and a plurality of new coded data each being a new DCT coefficient represented in Huffman coding method;

an input step of inputting JPEG image data;

a block data acquisition step of acquiring block coded data of one block from the JPEG image data inputted in said input step;

a first acquisition step of acquiring DCT coefficients represented in Huffman coding method, which are for embedding embed bits, from among comparatively low-frequency coefficients with the exception of DC coefficients in the block coded data acquired in said block data acquisition step;

second acquisition step of acquiring, referring to said table memory, new DCT coefficients represented in Huffman coding method using the DCT coefficients acquired by said first acquisition step and the embed bits; and an updating step of updating the block coded data by replacing the DCT coefficients acquired by said first acquisition step with the new DCT coefficients acquired by said second acquisition step, wherein in a case where code length of the new DCT coefficients acquired by said second acquisition step is different from that of the DCT coefficients acquired by said first acquisition step, said updating step adjusts code length of the JPEG image data and then updates the block coded data.

5. A computer-readable storage medium storing a program for causing a computer to implement the information processing method set forth in claim 4.

* * * * *